May 16, 1933.   E. R. GURNEY   1,908,751
SPRING SUSPENSION
Filed May 31, 1930
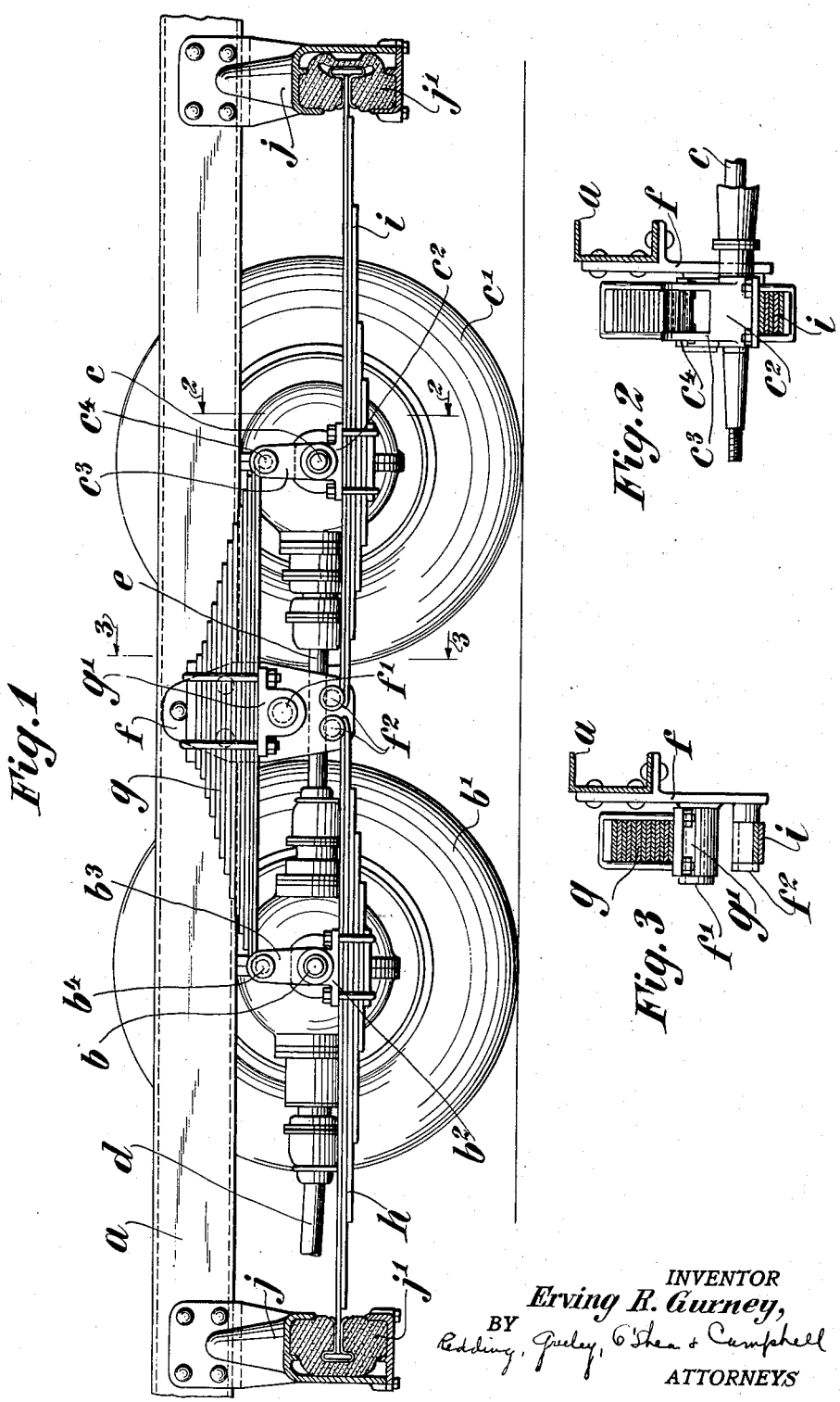
INVENTOR
Erving R. Gurney,
BY Redding, Greeley, O'Shea & Campbell
ATTORNEYS Patented May 16, 1933

1,908,751

UNITED STATES PATENT OFFICE

ERVING R. GURNEY, OF ALLENTOWN, PENNSYLVANIA, ASSIGNOR TO INTERNATIONAL MOTOR COMPANY, OF NEW YORK, N. Y., A CORPORATION OF DELAWARE

SPRING SUSPENSION

Application filed May 31, 1930. Serial No. 457,781.

The present invention relates to spring suspensions for motor vehicles and embodies, more specifically, an improved suspension for vehicles having four or more driving wheels mounted as a unit upon the chassis.

Where a plurality of driving axles are utilized upon a motor vehicle frame, it is extremely difficult to mount each axle upon the frame in such manner that it may be entirely free to partake of such movements as may be necessary to conform to the uneven and irregular surface of the road bed over which the vehicle travels. This is particularly true in the case of driving axles where power must be transmitted thereto from a fixed source upon the frame and a rigid mechanical connection must be preserved between such source of power and the respective driving axles.

In order that a plurality of axles may be effectively mounted upon the vehicle frame and power supplied thereto without impairing the flexibility of the mounting of each independent axle, the present invention has been devised and an object thereof, accordingly, is to provide an improved mounting for a plurality of driving axles, each axle being effectively anchored to the frame in order that it may properly drive the vehicle, the flexibility of such mounting, however, being fully preserved in order that each axle may be free to move with respect to the frame.

A further object of the invention is to provide a mounting of the above character, the parts thereof being simple in construction and assembled in such manner that an extremely rugged and flexible mounting is provided.

Further objects, not specifically enumerated above, will be apparent as the invention is described in greater detail in connection with the accompanying drawing, wherein:

Figure 1 is a view in side elevation, showing a spring suspension constructed in accordance with the present invention, the wheels at one side of the vehicle being removed.

Figure 2 is a view in section, taken on line 2—2 of Figure 1, and looking in the direction of the arrows.

Figure 3 is a view in section, taken on line 3—3 of Figure 1 and looking in the direction of the arrows.

Referring to the above drawing, $a$ designates the frame of a motor vehicle having a plurality of driving axles $b$ and $c$. Wheels $b'$ and $c'$ are mounted upon the respective axles and receive power from a propeller shaft $d$ and shaft section $e$, as clearly shown in Figure 1. Since the specific driving mechanism forms no part of the present invention further description thereof is unnecessary herein.

Intermediate the axles $b$ and $c$, and secured to the respective side frame members $a$ are brackets $f$ which are formed with anchor pins $f'$ upon which a spring $g$ is secured intermediate its ends as by means of a bracket and clip structure $g'$. Below the pins $f'$ on the respective brackets $f$, are spaced anchor pins $f^2$ for securing the adjacent ends of the respective springs $h$ and $i$.

Springs $h$ and $i$ are secured to the respective brackets $b^2$ and $c^2$, being mounted upon the respective axles $b$ and $c$ as will be apparent from Figure 1. Opposed housings $j$ are mounted upon the frame $a$ to receive the opposite ends of the respective springs $h$ and $i$. Yielding non-metallic material $j'$ is provided in each housing to secure the springs yieldingly with provision for a degree of movement with respect to the frame.

The brackets $b^2$ and $c^2$ are formed with upwardly extending bifurcated portions $b^3$ and $c^3$, pins $b^4$ and $c^4$ being mounted in these portions to secure the ends of springs $g$ to the axles upon opposite sides of the frame.

From the foregoing, it will be seen that each axle is mounted with provision for unrestricted movement with respect to the other and to the frame, thus affording an effective mounting for the driving axles $b$ and $c$. The springs $h$ and $i$ are preferably designed to take only a small portion of the load, spring $g$ assuming the major portion thereof. Spring $g$ oscillates freely upon the anchor pin $f'$.

In the conventional type of suspension using one or more springs pivoted at their centers and having the ends thereof resting on the axles, a very heavy load is imposed upon the bearing at the anchor pin $f'$ when the vehicle turns a corner in view of the fact that the wheels tend to roll straight ahead and resist the turning movement. The bearings at the anchor pins $f'$ must overcome this tendency and the resulting stress is very great since the resisting force must be taken through the leverage of the springs. In the present design, the foregoing condition is relieved since the steering load is taken through the springs $h$ and $i$. There are no torque arms or radius rods, the driving and braking torque being taken longitudinally through the springs. The springs may furthermore be designed in such manner that the action of one will help to dampen the action of another and thus serve in the nature of a shock absorber.

While the invention has been described with specific reference to the accompanying drawing, it is not to be limited, save as defined in the appended claims.

I claim as my invention:

1. A spring suspension for a plurality of axles comprising a spring, a bracket on a vehicle frame, means to journal the spring on the bracket intermediate its ends, brackets anchored to the axles, bifurcated arms on the last named brackets to journal the ends of the spring, additional springs, means to secure the opposite ends of the last named springs to the frame, means to secure the other ends to the first bracket, and means to mount the last named spring upon the last named brackets intermediate the ends thereof.

2. A spring suspension for a plurality of axles comprising a mounting bracket upon a vehicle frame, a spring journaled upon the bracket, means to connect the ends of the spring pivotally with the axles, additional springs, means to secure the opposite ends of the additional springs to the frame, means to secure the said additional springs to the axles intermediate the ends thereof, and means to mount the adjacent ends of the vehicle springs to the bracket.

3. A spring suspension for a plurality of axles comprising a spring journaled intermediate its ends upon a vehicle frame, means to connect the ends of the spring pivotally with the axles, additional springs, means to secure the ends of the additional springs to the frame, and means to secure the said additional springs to the pivot means for the ends of the first spring intermediate the ends thereof.

This specification signed this 9th day of April A. D. 1930.

ERVING R. GURNEY.